No. 734,959. PATENTED JULY 28, 1903.
E. D. ROCKWELL.
FISH LINE REEL.
APPLICATION FILED MAR. 4, 1903.
NO MODEL. 2 SHEETS—SHEET 1.
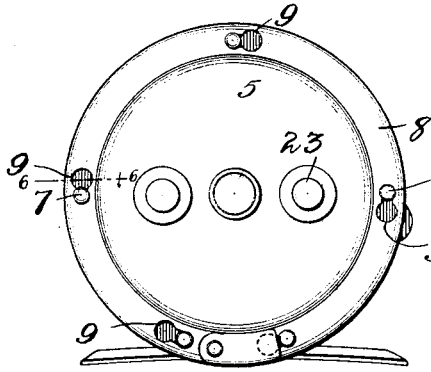
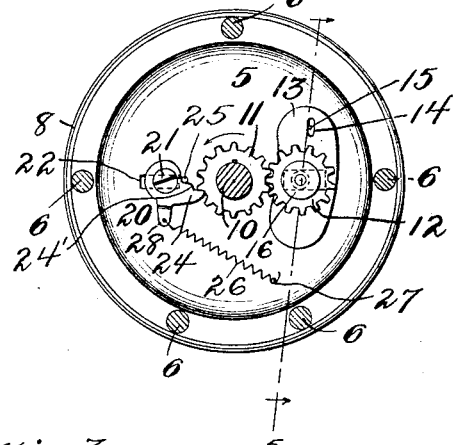
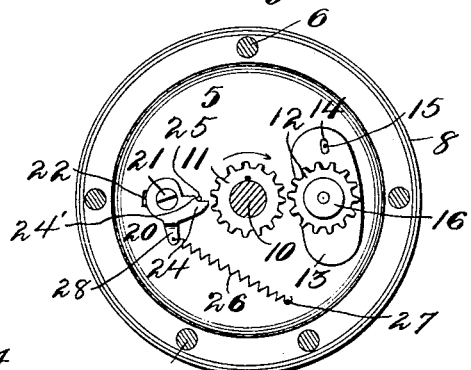
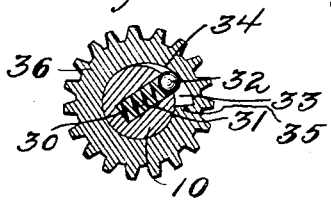
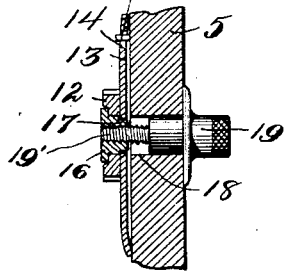
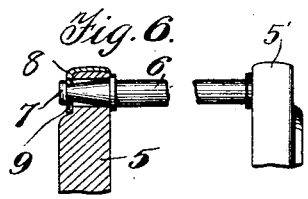
Witnesses:
F. G. Campbell.
Wm. P. Laraway.
Inventor:
Edward D. Rockwell.
by his Attorneys:
Blodgett & Peck No. 734,959. PATENTED JULY 28, 1903.
E. D. ROCKWELL.
FISH LINE REEL.
APPLICATION FILED MAR. 4, 1903.
NO MODEL. 2 SHEETS—SHEET 2.

Witnesses:
F. G. Campbell.
Wm. P. Laraway

Inventor:
Edward D. Rockwell.
By his Attorneys:

No. 734,959. Patented July 28, 1903.

UNITED STATES PATENT OFFICE.

EDWARD D. ROCKWELL, OF BRISTOL, CONNECTICUT, ASSIGNOR TO THE LIBERTY BELL COMPANY, OF BRISTOL, CONNECTICUT, A CORPORATION OF CONNECTICUT.

FISH-LINE REEL.

SPECIFICATION forming part of Letters Patent No. 734,959, dated July 28, 1903.

Application filed March 4, 1903. Serial No. 146,223. (No model.)

*To all whom it may concern:*

Be it known that I, EDWARD D. ROCKWELL, a citizen of the United States, residing at Bristol, in the county of Hartford and State of Connecticut, have invented certain new and useful Improvements in Fish-Line Reels, of which the following is a specification.

My invention relates to fish-line reels.

One of the main objects of the invention is the provision of means whereby the brake and click devices may be operative when the line is being pulled out, but will be instantly thrown out of engagement when said line is wound in.

A further object of the invention is the provision of improved means for locking the end plates of the reel together, whereby said reel may be readily assembled when desired.

Further objects and advantages of the invention will be set forth in the detailed description which now follows.

Figure 7:
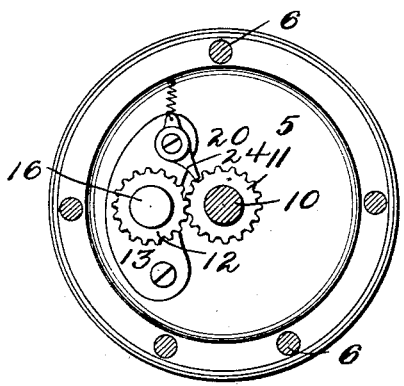
Figure 8:
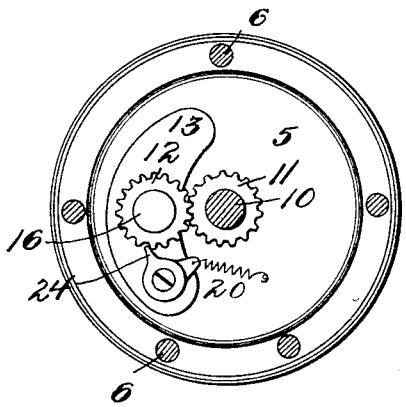

In the accompanying drawings, Figure 1 is a side elevation of a fish-line reel constructed in accordance with my invention. Fig. 2 is a view of the inner face of one of the end plates of the reel, showing the position the click and brake devices occupy when in engagement with the pinion carried by the spindle of the reel. Fig. 3 is a view illustrating the position said parts assume when the spool is rotated to wind in the line. Fig. 4 is a sectional view of a pinion which may be substituted for the pinion illustrated in Figs. 2 and 3, if desired. Fig. 5 is a sectional view upon line 5 5 of Fig. 2. Fig. 6 is an enlarged sectional view upon line 6 6 of Fig. 1. Fig. 7 is a view of a modification of the device, and Fig. 8 is a view of a further modification.

Like numerals designate similar parts throughout the several views.

Referring to the drawings, the numeral 5 designates one of the end plates of a fish-line reel, and 6 rods commonly employed for fastening said plates together, said rods being headed at 7, as best illustrated in Fig. 6. Spun or otherwise loosely secured upon end plate 5 is a locking-plate 8, having keyhole-slots 9 formed therein for a purpose hereinafter described.

The spindle 10 of the spool carries a pinion 11, which meshes with a drag-wheel 12, mounted upon a carrier 13, having a slot 14 formed therein for the reception of a pin 15, carried by the end plate 5. Means for regulating the tension to be placed upon said drag-wheel are illustrated in Fig. 5 and comprise a headed stud 16, having a collar 17, an angular portion of which enters a recess in the carrier 13, the head of said stud bearing against the face of the drag-wheel 12. Mounted for transverse movement in a slot 18 of end plate 5 is a thumb-screw 19, reduced, as at 19', and threaded into the collar 17 of stud 16, and by rotating said thumb-screw any desired tension may be placed upon the drag-wheel 12, or said drag-wheel and carrier may be manually thrown out of engagement with pinion 11, if desired.

Designated in a general way by 20 is the click mechanism of the reel, the click proper being pivoted upon a screw 21, which passes through a slot 22, formed in end plate 5, and engages a cap 23 upon the outer face of said plate, whereby said click may be manually operated when desired. A tongue 24 of the click, the outer end of which engages the pinion 11, is normally held against a pin 25, projecting from plate 5, by the tension of a spring 26, one end of which is secured to a pin 27 and the other end of which engages an extension 28 of said click. When the click is thrown out of engagement with pinion 11, as will be hereinafter described, a locking-shoulder 24' of tongue 24 snaps behind pin 25 and prevents the click from being accidentally thrown into contact with said pinion.

The operation of this form of my improved reel is as follows: After the various parts have been placed in position and the bars 6 have been inserted in the slots 9 of locking-plate 8 said locking-plate is turned to cause the walls of the narrow portions of said slots to engage the headed ends 7 of the rods and to thereby lock the structure together, as will be readily seen by referring to Fig. 1, after which a latch 29 is swung into the position illustrated in said figure to prevent the accidental movement of the locking-plate. In Fig. 2 the arrow indicates the direction in which the pinion 11 rotates when the line is being drawn out, and, as illustrated in said figure, the click and drag-wheel will remain in engagement with said pinion as long as such rotation continues. When, however, the rotation of said pinion is reversed, said click and drag-wheel will be automatically thrown out of engagement with said pinion, and the parts will assume the positions illustrated in Fig. 3. This result is attained by pivoting the carrier 13 upon pin 15, for it is obvious that since the drag-wheel 12 has a frictional bearing upon the face of said carrier the tendency will be to impart movement to said carrier in the same direction in which the drag-wheel 12 rotates, and by pivoting the carrier upon pin 15 said carrier is forced to swing in an arc struck from the center of said pin. This swinging movement of the carrier causes the drag-wheel 12 to remain in mesh with pinion 11 as long as the pinion rotates in the direction of the arrow in Fig. 2, at which time the line is being drawn out and throws said drag-wheel away from said pinion when the pinion rotates in the direction of the arrow in Fig. 3 to wind in the line. When desired, the brake and click devices are manually thrown into engagement with pinion 11. In Fig. 7 the operation is the same, excepting that the click and drag-wheel are both mounted upon the carrier, said click engaging, as before, with pinion 11, while in Fig. 8 said click is mounted upon the carrier in such manner as to engage the teeth of the drag-wheel 12.

Referring now to Fig. 4, it will be seen that the spindle 10 of the spool is chambered, as at 30, and in said chamber is a spring 31, bearing against a ball 32 to force said ball outward into a recess 33, having an inclined wall 34 and a locking-shoulder 35, formed in pinion 36. When the pinion illustrated in Fig. 4 is substituted for pinion 11, the ball-ratchet composed of spring 31, ball 32, and locking-shoulder 35 serves to lock said pinion to spindle 10 when the line is being drawn out, but allows said pinion to remain motionless when said line is wound in, and by virtue of this construction the brake and click devices after having been once thrown into engagement with the pinion will remain so until thrown out of such engagement by hand. As will be readily seen, this construction obviates the necessity of throwing said click and brake devices into engagement every time the fish starts to run out with the line.

From the foregoing description it will be seen that very simple means have been provided for causing the brake and click devices of a fishing-reel to remain in engagement with the spindle of the reel as long as the line is being drawn out and to be instantly thrown out of engagement when said line is wound in, and while the particular arrangement of parts shown and described is well suited to effect this object it is to be distinctly understood that the invention is not limited thereto, for changes of the details thereof may be made without departure therefrom.

Having thus described my invention, what I claim is—

1. In a fish-line reel, the combination, with the reel-spindle, of a pinion carried by said spindle; a carrier; brake and click devices engaging said pinion when the line is running out, one of said devices being mounted upon the carrier, and means for causing said brake and click devices to be thrown out of engagement with the pinion when the spool is rotated to wind in the line.

2. In a fish-line reel, the combination, with the reel-spindle, of a pinion carried by said spindle; a carrier; brake and click devices mounted upon said carrier and engaging said pinion when the line is running out; and means for causing said brake and click devices to be automatically thrown out of engagement with the pinion when the spool is rotated to wind in the line.

3. In a fish-line reel, the combination, with the reel-spindle, of a pinion carried by said spindle; a carrier; a drag-wheel in engagement with the pinion when the line is running out carried by the carrier; a movable click; means for holding the click in engagement with said pinion while the line is running out; and means for locking the click out of engagement with the pinion.

4. The combination, with a frame, of a spindle; a pinion carried by said spindle; a click movable in a slot of the frame, and having a notch; a spring for throwing in the click; and a pin for engaging the notch in said click and thereby holding it out of contact with the pinion.

5. The combination, with a frame, of a reel-spindle mounted in said frame; a notched click movably mounted on one of the end plates of the frame; a spring for throwing in the click; a pinion carried by the spindle; a drag for engaging the pinion; and a pin on the end plate for engaging the notch in the click.

6. The combination, with a frame, of a reel-spindle mounted in said frame; a pinion carried by the spindle; a drag-wheel in engagement with the pinion; a movable plate upon which the drag-wheel is mounted; and means for holding the drag-wheel in engagement with said plate with sufficient friction to cause the drag-wheel to remain in engagement with the pinion when the spindle is rotated in one direction and to be thrown out of contact with said pinion when the spindle is rotated in the other direction.

7. The combination, with a frame having end plates, of a spindle; a pinion on the spindle; a plate having an opening; a pin on one of the end plates passing through said opening; a drag-wheel mounted for rotation on the plate; and means for holding the drag-wheel in frictional engagement with the plate.

8. The combination, with a frame having end plates, of a carrier pivoted to one of said end plates; a drag-wheel; an adjustable device for causing the drag-wheel to bear frictionally upon the carrier; a spindle journaled in the end plates; and a pinion on said spindle, and with which the drag-wheel is adapted to engage.

9. The combination, with a reel-spindle, of a pinion carried by said spindle; a bowed carrier pivoted to an end plate of the reel; a drag-wheel adapted to engage the pinion, the face of said drag-wheel being in frictional engagement with the carrier; a thumb-screw, the barrel of which passes through a slot of the end plate; and an internally-threaded, flanged stud having an angular portion entering a slot of the carrier, said stud having a collar upon which the drag-wheel rotates.

10. In a fish-line reel, the combination, with the reel-frame, of a spindle; a pinion carried by said spindle; a pivoted carrier; a drag-wheel mounted on said carrier, the inner face of said wheel being in frictional contact with the carrier; and means mounted on an end plate of the frame and adapted to hold the drag-wheel in engagement with the carrier and to actuate the carrier to throw said wheel out of engagement with the pinion.

In testimony whereof I affix my signature in presence of two witnesses.

EDWARD D. ROCKWELL.

Witnesses:
   FRANK G. CAMPBELL,
   FRANCES E. BLODGETT.